(12) United States Patent
Park et al.

(10) Patent No.: US 10,078,444 B2
(45) Date of Patent: Sep. 18, 2018

(54) MOBILE TERMINAL AND METHOD FOR CONTROLLING MOBILE TERMINAL

(71) Applicant: LG ELECTRONICS INC., Seoul (KR)

(72) Inventors: Hyungshin Park, Seoul (KR); Annah Roh, Seoul (KR); Jinkyu Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 244 days.

(21) Appl. No.: 14/899,086

(22) PCT Filed: Jun. 25, 2013

(86) PCT No.: PCT/KR2013/005596
§ 371 (c)(1),
(2) Date: Dec. 16, 2015

(87) PCT Pub. No.: WO2014/208783
PCT Pub. Date: Dec. 31, 2014

(65) Prior Publication Data
US 2016/0196055 A1    Jul. 7, 2016

(51) Int. Cl.
*G06F 15/00* (2006.01)
*G06F 3/0488* (2013.01)
(Continued)

(52) U.S. Cl.
CPC ........ *G06F 3/04883* (2013.01); *G06F 3/0481* (2013.01); *G06F 3/04817* (2013.01); *G06F 3/04842* (2013.01); *G06F 3/04845* (2013.01); *G06F 3/04886* (2013.01); *G06F 17/24* (2013.01); *G06F 17/2765* (2013.01); *G06K 9/2081* (2013.01); *G06K 9/22* (2013.01); *G06K 2209/011* (2013.01)

(58) Field of Classification Search
CPC ....................... G06F 17/30864; H04M 1/0264
USPC .............. 715/763–765, 740, 851; 455/556.1
See application file for complete search history.

(56) References Cited

U.S. PATENT DOCUMENTS 9,578,246 B2 * 2/2017 Kim
2006/0142054 A1 * 6/2006 Wang .................. G06K 9/2054
455/556.1

(Continued)

FOREIGN PATENT DOCUMENTS

KR    10-2010-0056028    5/2010

OTHER PUBLICATIONS

PCT International Application No. PCT/KR2013/005596, Written Opinion of the International Searching Authority dated Dec. 30, 2013, 11 pages.

*Primary Examiner* — Kevin Nguyen
(74) *Attorney, Agent, or Firm* — Lee, Hong, Degerman, Kang & Waimey

(57) ABSTRACT

A mobile terminal and a method for controlling the mobile terminal are disclosed. The mobile terminal, according to one embodiment, can display images including characters on a touch screen, receive consecutive touch inputs through the touch screen, display lines on regions of images corresponding to the consecutive touch inputs, extract the characters of which parts intersect with the lines when a particular input is received through the touch screen, and display the characters on a pop-up window.

20 Claims, 27 Drawing Sheets

(51) Int. Cl.
*G06F 3/0481* (2013.01)
*G06K 9/20* (2006.01)
*G06K 9/22* (2006.01)
*G06F 3/0484* (2013.01)
*G06F 17/24* (2006.01)
*G06F 17/27* (2006.01)

(56) References Cited

U.S. PATENT DOCUMENTS

2009/0182548 A1    7/2009  Zwolinski
2009/0247219 A1*  10/2009  Lin .................... G06F 17/30253
                                                                     455/556.1
2009/0259673 A1*  10/2009  Choi ................. G06F 17/30616
2012/0131520 A1    5/2012  Tang et al.
2013/0024441 A1*   1/2013  Sun ................... G06F 17/30864
                                                                     707/710
2016/0044235 A1*   2/2016  Cho .................... H04M 1/0264
                                                                     348/333.05

* cited by examiner

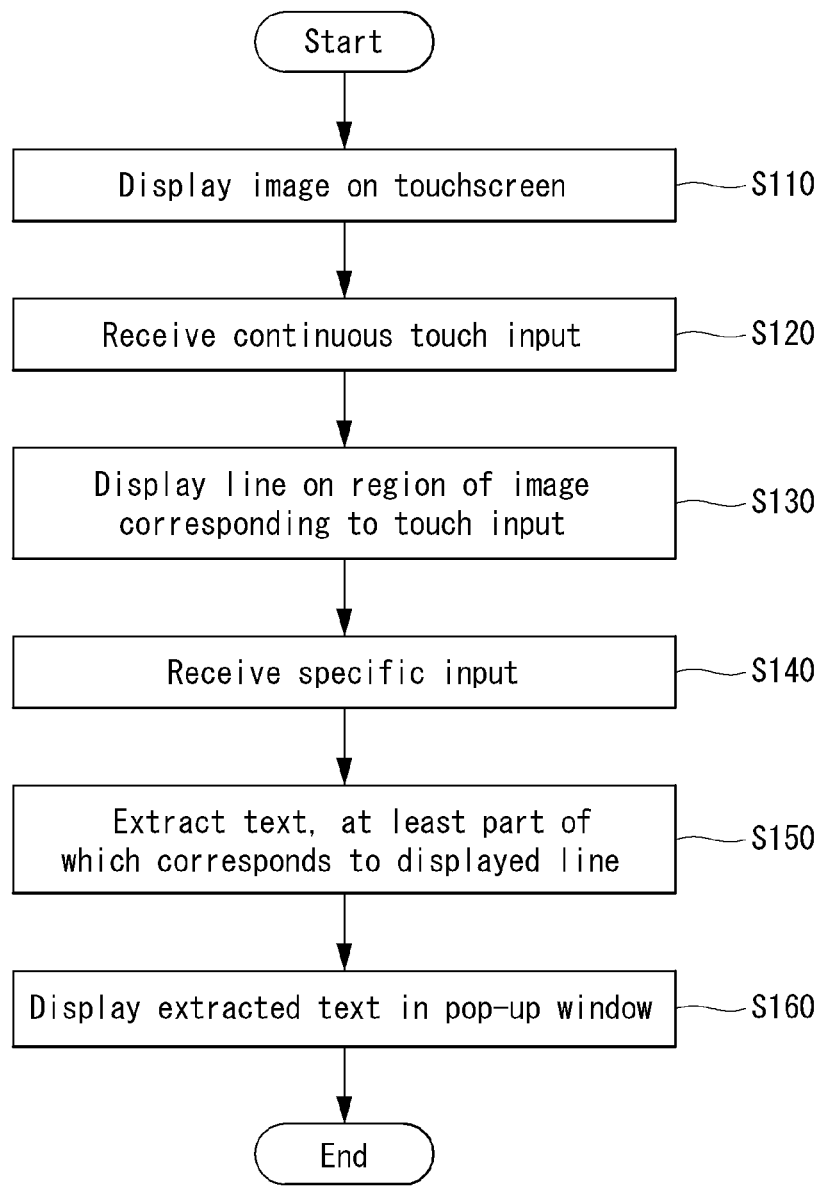

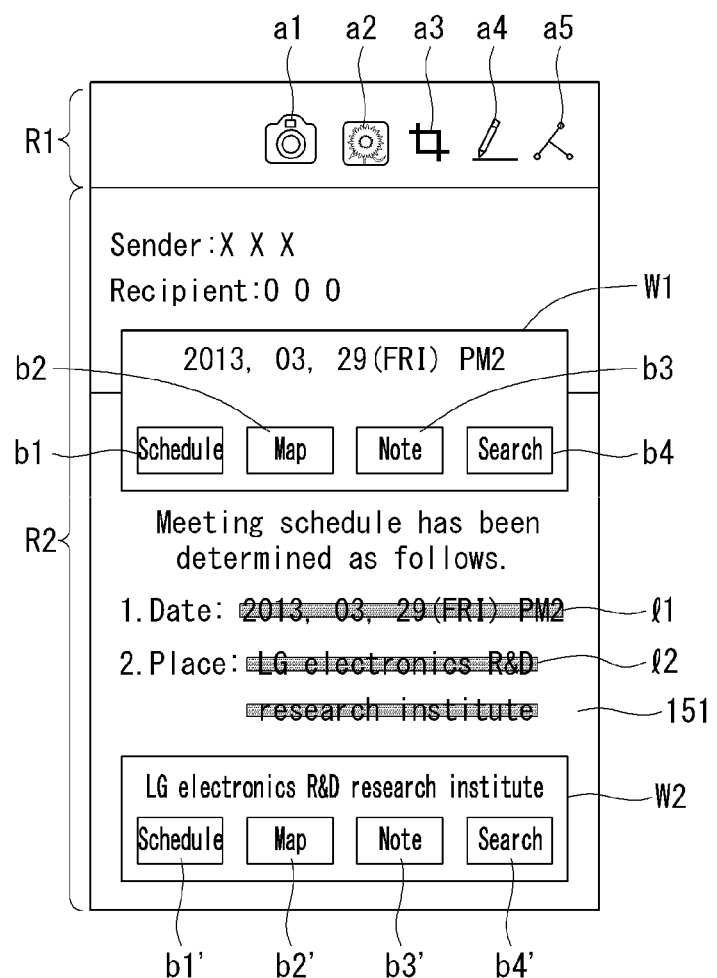

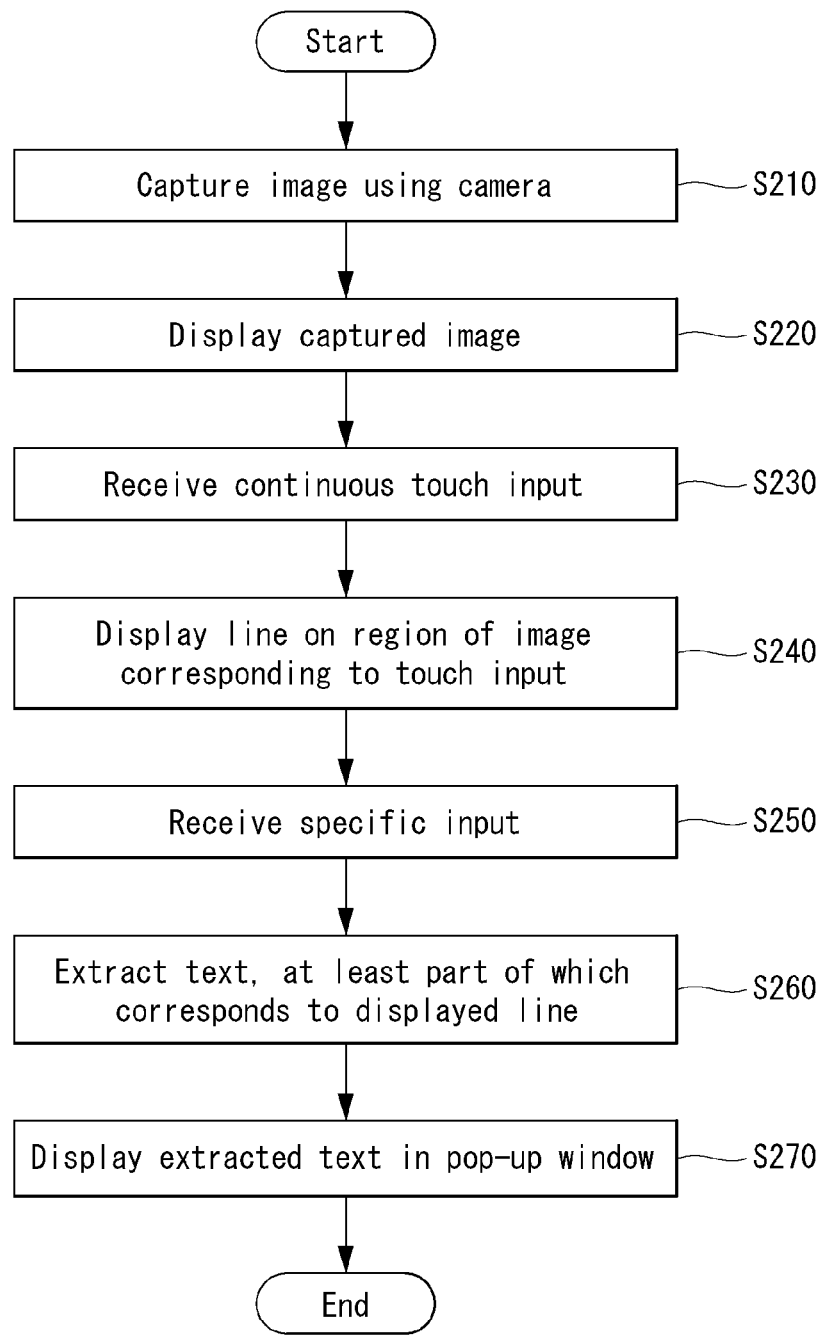

MOBILE TERMINAL AND METHOD FOR CONTROLLING MOBILE TERMINAL

CROSS-REFERENCE TO RELATED APPLICATIONS

This application is the National Stage filing under 35 U.S.C. 371 of International Application No. PCT/KR2013/005596, filed on Jun. 25, 2013, the contents of which are all hereby incorporated by reference herein in their entirety.

BACKGROUND OF THE DISCLOSURE

1. Field of the Disclosure

The present disclosure relates to a mobile terminal for recognizing text using optical character recognition and recommending applications and a method for controlling the same.

2. Background of the Disclosure

Recent mobile terminals such as smartphones provide various multimedia services such as data communication, camera, DMB, video playback, text message services as well as voice call functions.

It is possible to acquire images including text such as a business card, magazine, logo, sign and printout using cameras of mobile terminals and to extract text from the acquired image using optical character recognition (OCR).

When text is extracted from an image using OCR, although the entire text included in the image can be extracted, only specific text designated by a user cannot be extracted from the image.

SUMMARY OF THE DISCLOSURE

Accordingly, an object of the present invention is to address the above-noted and other problems.

Another object of the present invention is to provide a mobile terminal for designating a specific region or specific text included in an image, extracting only text corresponding to the designated specific region using OCR and recommending an application related to the extracted text, and a method for controlling the same.

A mobile terminal according to one aspect of the present invention to accomplish the objects of the present invention includes: a touchscreen; and a controller configured to display an image including text on the touchscreen, to receive continuous touch input through the touchscreen, to display a line on a region of the image, corresponding to the continuous touch input, to extract text, at least part of which corresponds to the line, when specific input is received through the touchscreen, and to display the text in a pop-up window.

The controller may be configured to display the line in real time according to the continuous touch input.

The controller may be configured to display at least one new line on a region of the image, corresponding to at least one new continuous touch input, when the at least one new continuous touch input is received through the touchscreen prior to reception of the specific input.

The controller may be configured to extract text, at least part of which corresponds to each line, and to respectively display extracted text in at least one pop-up window when the specific input is received, and to respectively display at least one icon indicating a related application in the at least one pop-up window according to the contents of the text.

The controller may be configured to display at least one icon indicating a related application along with the extracted text in the pop-up window according to the contents of the extracted text.

When input with respect to one of the at least one icon is received, the controller may be configured to execute an application corresponding to the icon, to divide the text displayed in the pop-up window into parts depending on the contents of the text and to display the divided parts as at least one input item of the execution screen of the application.

When long touch input applied to a region of the line is received, the controller may be configured to enter a mode for editing the line and to display an icon for controlling the length of the line or to display an icon for moving the line according to the point to which the long touch input is applied.

The controller may be configured to magnify and display the image when specific input is received through the touchscreen and to fix the magnified image when long touch input applied to a region of the magnified image is received.

The controller may be configured to enter a mode for editing the text when touch input applied to the text displayed in the pop-up window is received.

The controller may be configured to delete the line and the pop-up window when input with respect to a reset icon displayed on the touchscreen is received.

The line may be displayed in a predetermined thickness, wherein the controller is configured to display the line transparently or translucently in a predetermined color or contrast.

The controller may be configured to set a virtual region by extending the thickness of the line in the vertical direction and to extract text included in the virtual region.

A mobile terminal according to another aspect of the present invention to accomplish the objects of the present invention includes: a touchscreen; a camera; and a controller configured to display an image captured through the camera as a preview image on the touchscreen, to receive continuous touch input through the touchscreen, to display a line on a region of the image, corresponding to the continuous touch input, to extract text, at least part of which corresponds to the line, when specific input is received through the touchscreen, and to display the text in a pop-up window.

A method for controlling a mobile terminal according to another aspect of the present invention to accomplish the objects of the present invention includes: displaying an image including text on a touchscreen; receiving continuous touch input through the touchscreen while the image is displayed; displaying a line on a region of the image, corresponding to the continuous touch input; receiving specific input through the touchscreen; and extracting text, at least part of which corresponds to the line, according to the specific input and displaying the extracted text in a pop-up window.

A method for controlling a mobile terminal according to another aspect of the present invention to accomplish the objects of the present invention includes: capturing an image including text by operating a camera; displaying the captured image as a preview image on a touchscreen; receiving continuous touch input through the touchscreen while the image is displayed; displaying a line on a region of the image, corresponding to the continuous touch input; receiving specific input through the touchscreen; and extracting text, at least part of which corresponds to the line, according to the specific input and displaying the extracted text in a pop-up window.

Details of other embodiments are included in the detailed description and the attached drawings.

The advantages of the mobile terminal and the method for controlling the same according to the present invention will now be described.

According to one embodiment of the present invention, it is possible to extract only desired text of a user, which corresponds to a specific region of an image displayed through a touchscreen of a mobile terminal, by directly selecting the specific region according to continuous touch input.

According to one embodiment of the present invention, it is possible to accurately control the size of the specific region such that the start and end of the desired text of the user correspond the specific region according to specific input applied through the touchscreen of the mobile terminal, thereby increasing a character recognition rate.

According to one embodiment of the present invention, it is possible to select a plurality of specific regions from one image and to simultaneously extract text items, at least parts of which are included in the selected specific regions.

According to one embodiment of the present invention, it is possible to directly extract text from not only an image stored in the mobile terminal but also an image captured by a camera.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 3 and 4 are flowcharts illustrating a method for controlling the mobile terminal in accordance with a first embodiment of the present disclosure;

FIGS. 8A and 8B illustrate a method for extracting and displaying text in the mobile terminal in accordance with the first embodiment of the present disclosure;

FIG. 10 illustrates a method for controlling the mobile terminal in accordance with a second embodiment of the present disclosure;

DETAILED DESCRIPTION OF THE PREFERRED EMBODIMENTS

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
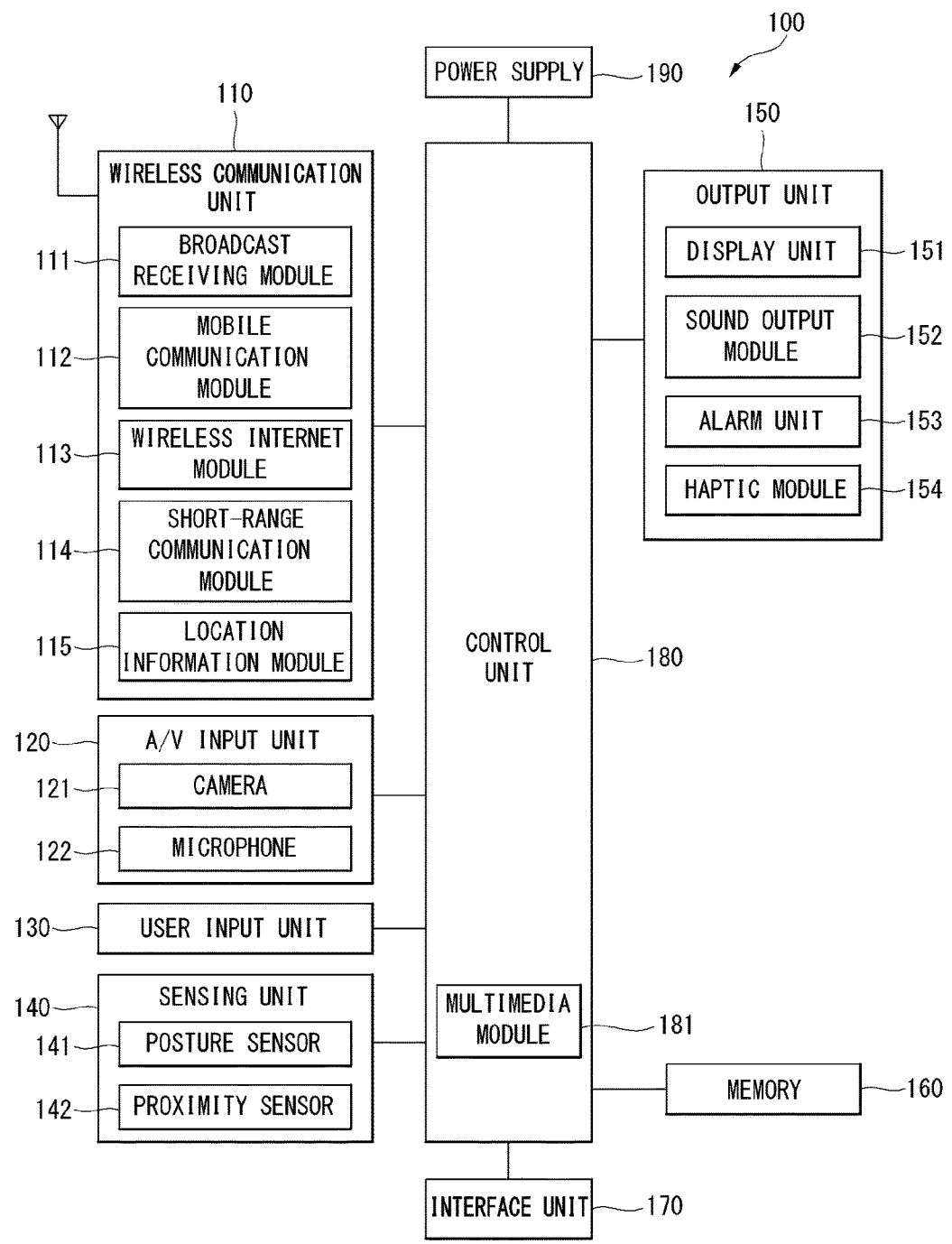
FIG. 1 is a block diagram of a mobile terminal in accordance with the present disclosure.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (WiMax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100.

The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
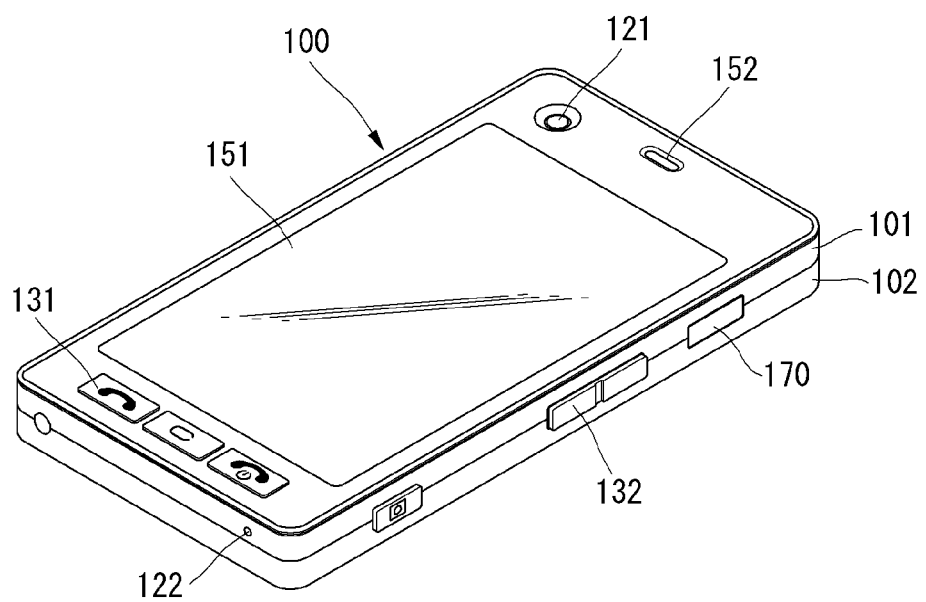
FIG. 2A is a front perspective view of the mobile terminal in accordance with an embodiment of the present disclosure.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
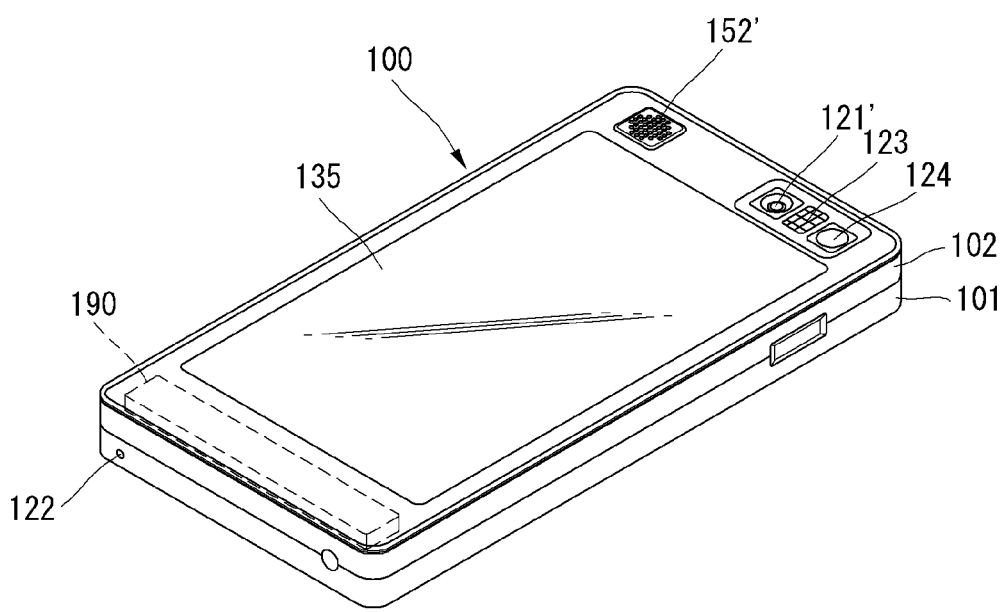
FIG. 2B is a rear perspective view of the mobile terminal in accordance with an embodiment of the present disclosure.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

A description will be given of embodiments of the present invention.

Figure 4:
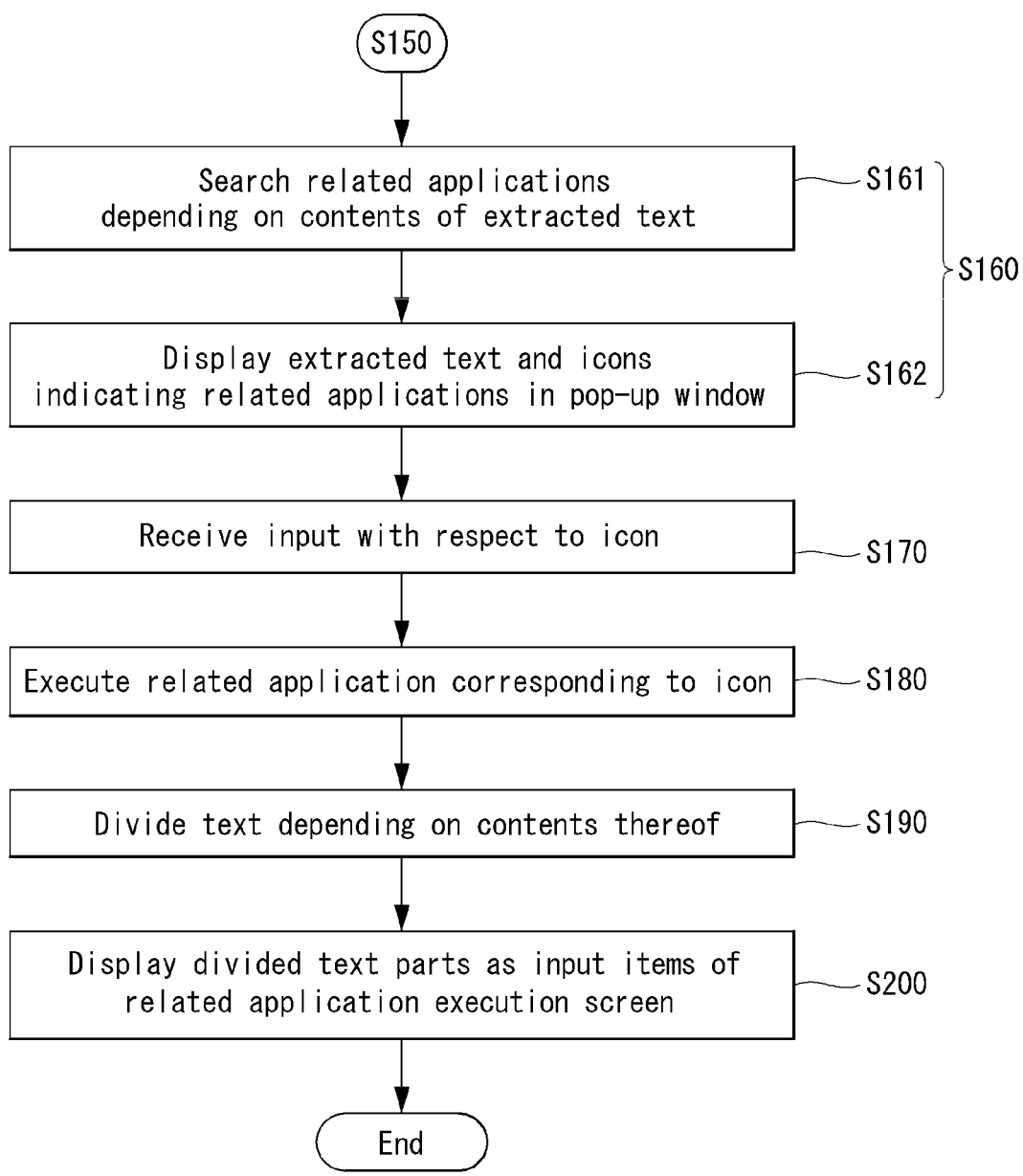

FIGS. 3 and 4 are flowcharts illustrating a method for controlling the mobile terminal in accordance with a first embodiment of the present disclosure and FIGS. 5A to 9C are views for explaining the method for controlling the mobile terminal in accordance with the first embodiment of the present disclosure.

FIG. 3 is a flowchart illustrating a method for controlling the mobile terminal to extract text from an image displayed on the touchscreen in accordance with the first embodiment of the present disclosure.

Referring to FIG. 3, the controller (180 of FIG. 1) may display an image including text on the touchscreen (S110). Here, the image may include a picture stored in the memory of the mobile terminal, a capture image of a webpage displayed on the touchscreen of the mobile terminal and a preview image captured by a camera and displayed on the touchscreen.

The controller (180 of FIG. 1) may receive continuous touch input through the touchscreen on which the image is displayed (S120). Here, the continuous touch input may refer to input of continuously touching neighboring points with a finger without releasing the finger, such as drag input, flicking input or sliding input.

Specifically, when a user drags a region, which includes text to be extracted, in the image displayed on the touchscreen, the controller (180 of FIG. 1) receives continuous touch input.

The controller (180 of FIG. 1) may display a line on the region of the image, which corresponds to the received touch input (S130). That is, when touch input applied to a point is received and touch input applied to a neighboring point is received, the controller (180 of FIG. 1) can display a line along the continuous touch input in real time.

The controller (180 of FIG. 1) may display the line in a predetermined thickness or display the line thicker or thinner than a predetermined reference value in proportion to the area to which the touch input is applied or capacitance variation. Furthermore, the controller may display the line transparently or translucently in a specific color or contrast on a layer different from the image such that the line and the image overlap. Accordingly, the user can see the image displayed on the lower layer through the line.

Upon reception of continuous touch input applied to a specific region of the touchscreen, the controller (180 of FIG. 1) may display one line on the region of the image, which corresponds to the touch input. Upon reception of at least one new continuous touch input, the controller (180 of FIG. 1) may display at least one new line while maintaining the previously displayed line. Accordingly, the controller (180 of FIG. 1) can display a plurality of separated lines overlapping with the image displayed on the touchscreen.

The controller (180 of FIG. 1) may receive specific input through the touchscreen on which at least one line is displayed and overlaps with the image (S140). Here, the specific input may be touch input applied to of a specific soft key through which a control signal for extracting text of the image, which corresponds to the at least one line, can be input, or operating input applied to a function key or a manipulation key.

The controller (180 of FIG. 1) may extract text, at least part of which corresponds to the at least one displayed line (S150). The controller (180 of FIG. 1) may extract the text, at least part of which corresponds to the line, using a method of searching for text included in the line through OCR while gradually extending the thickness of the line in the vertical direction on the basis of coordinates of the line displayed on the touchscreen.

Specifically, the controller (180 of FIG. 1) may extract the text by scanning an image region overlapping with the displayed line, processing data corresponding to the scanned region so as to extract text and, when text is not recognized through the image region overlapping with the displayed line, repeating the same procedure while gradually extending the thickness of the line in the vertical direction. Here, the controller (180 of FIG. 1) may gradually extend the thickness of the line in the vertical direction until a blank is detected.

The controller (180 of FIG. 1) may provide the extracted text by displaying the text in a pop-up window (S160). Upon reception of touch input applied to the displayed pop-up window, the controller (180 of FIG. 1) may convert the current mode of the mobile terminal to a mode for editing the text displayed in the pop-up window. Accordingly, the user can correct typos in the extracted text or add characters to the extracted text, store, copy, share or transmit the text.

When a plurality of separated lines is displayed, the controller (180 of FIG. 1) may display extracted text in a pop-up window per line or display extracted text for the respective lines through separate pop-up windows. When the extracted text is displayed through separate pop-up windows, the controller (180 of FIG. 1) may display the pop-up windows in different shapes such that each pop-up window indicates a relation with a line corresponding thereto.

FIG. 4 is a flowchart of a method for controlling the mobile terminal to recommend related applications according to extracted text in accordance with the first embodiment of the present disclosure.

The step of displaying extracted text in a pop-up window may include step S161 in which the controller (180 of FIG. 1) searches for related applications according to the contents of the extracted text and step S162 in which the controller displays icons indicating the related applications along with the text in the pop-up window.

For example, the controller (180 of FIG. 1) can recommend scheduling, search, e-mail and note applications as related applications when the text indicates a date and recommend map, note and transportation applications as related applications when the text indicates a place.

Upon reception of input applied to an icon corresponding to one of the related applications displayed in the pop-up window (S170), the controller (180 of FIG. 1) executes the related application corresponding to the icon (S180) and inputs the text displayed in the pop-up window as an input item of the execution screen of the related application.

The controller (180 of FIG. 1) may divide the text depending on the contents thereof (S190) and display the divided text parts as input items of the execution screen of the related application (S200).

For example, when the text is "2013, March, 22, PM 2, Gangnam station" and the related application includes input items of "date" and "place", the text can be divided into parts respectively corresponding to the input items and displayed as the corresponding input items.

A description will be given of an embodiment of a method for controlling the mobile terminal to extract specific text from a stored picture image and to execute a related application. It is assumed that the mobile terminal operates in a mode for OCR.

Figure 5A:
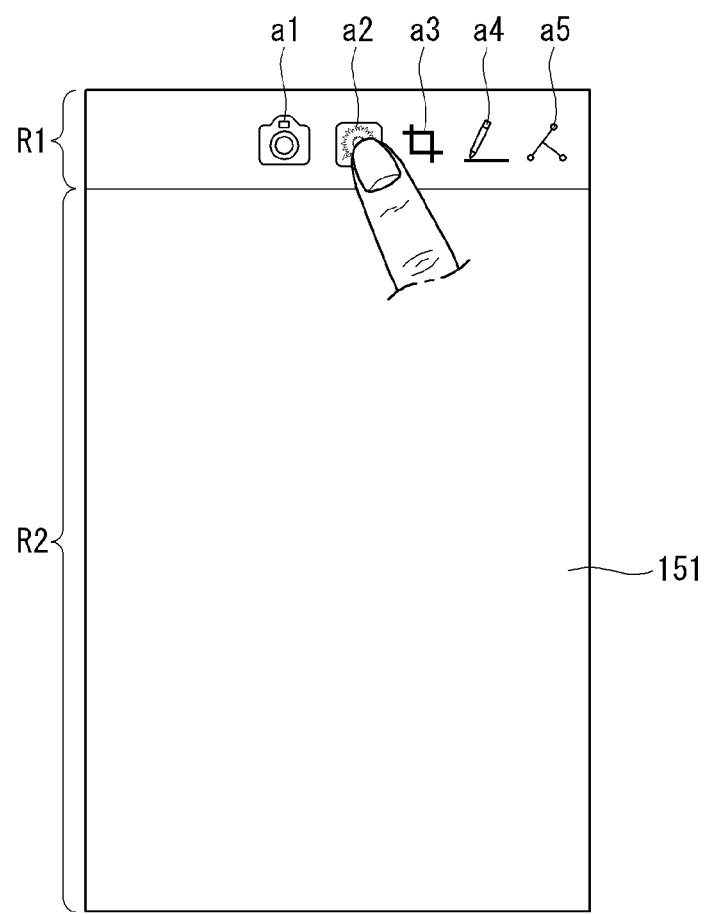
FIGS. 5A and 5B illustrate a method for displaying an image in the mobile terminal in accordance with the first embodiment of the present disclosure.
Figure 5B:
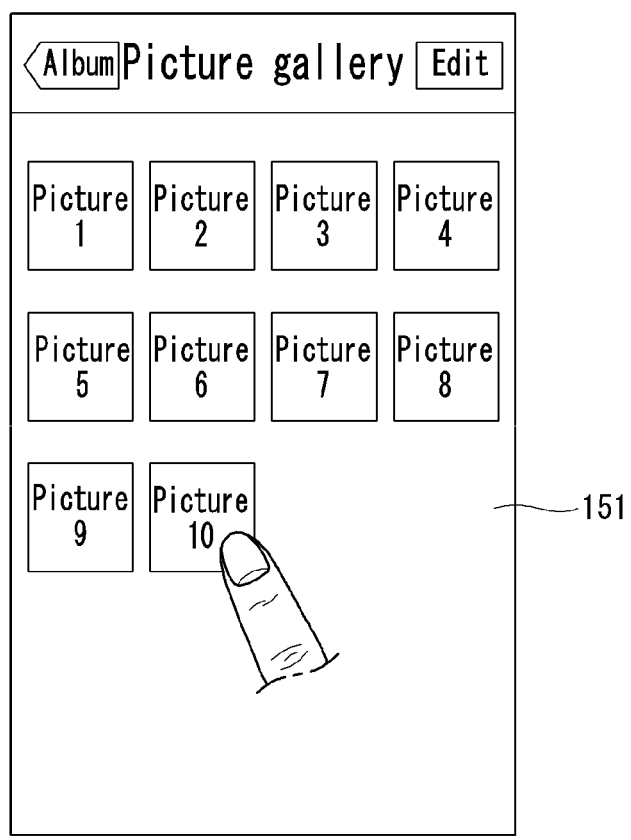

FIGS. 5A and 5B are views for explaining a method for displaying an image in the mobile terminal according to the first embodiment of the present disclosure.

Referring to FIG. 5A, the controller (180 of FIG. 1) may display a plurality of icons a1 to a5 in a first region R1 of the touchscreen 151 and receive touch input applied to an icon a3 which indicates a gallery application from among the plurality of icons.

Referring to FIG. 5B, the controller (180 of FIG. 1) may execute the gallery application upon reception of touch input applied to the gallery icon. Upon reception of touch input applied to a specific picture ("picture 10") in a picture gallery, the controller (180 of FIG. 1) may display the image of "picture 10" in a second region R2 of the touchscreen 151 (refer to FIG. 6A). The image of "picture 10" is a capture image of an e-mail message.

Figure 6A:
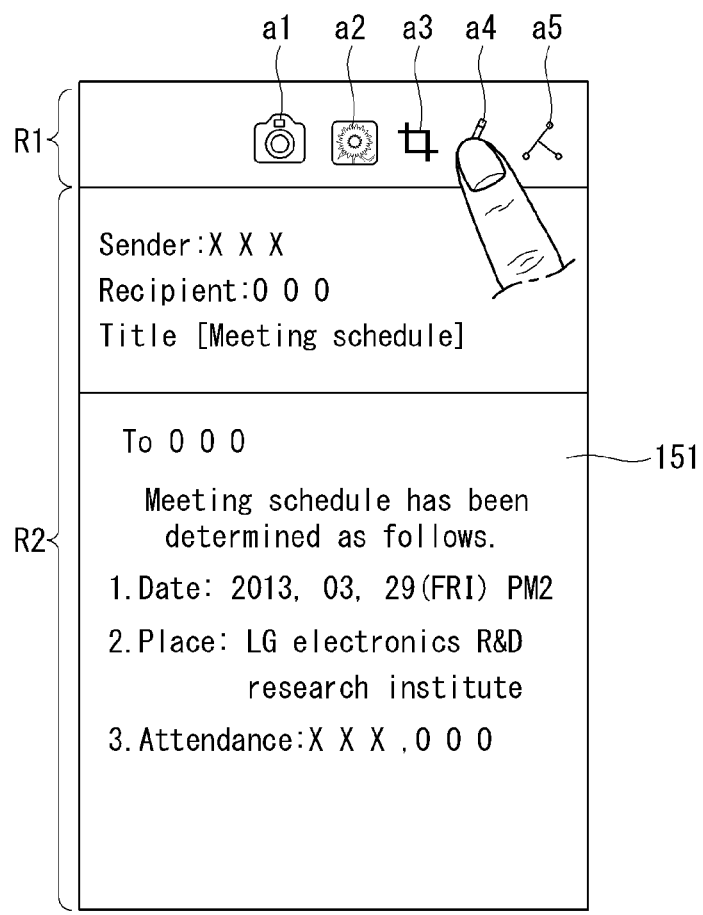
FIGS. 6A to 6C illustrate a method for receiving continuous touch input and displaying a line in the mobile terminal in accordance with the first embodiment of the present disclosure.
Figure 6B:
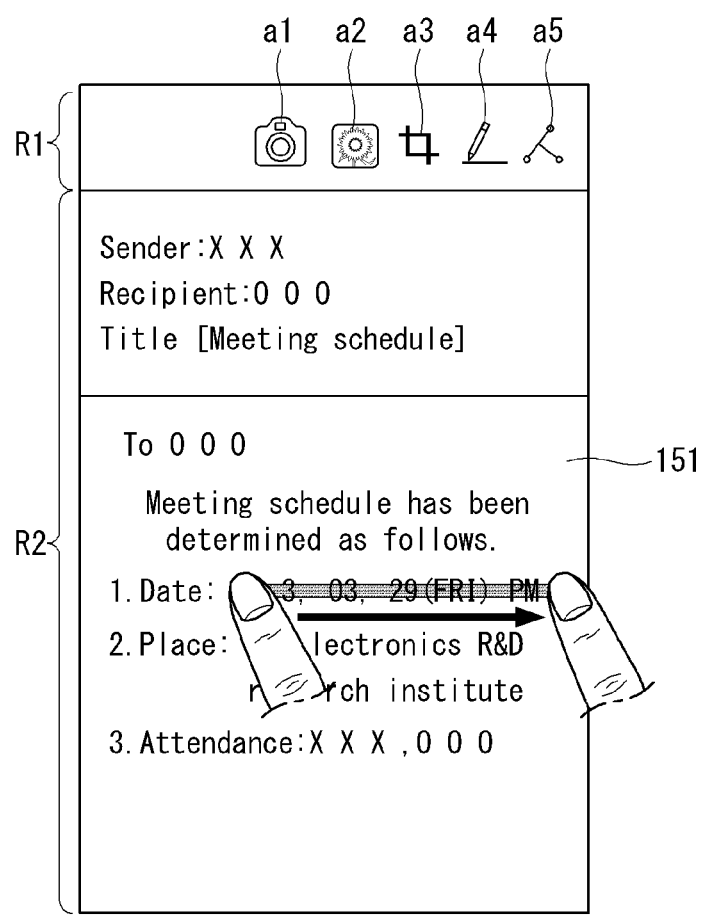
Figure 6C:
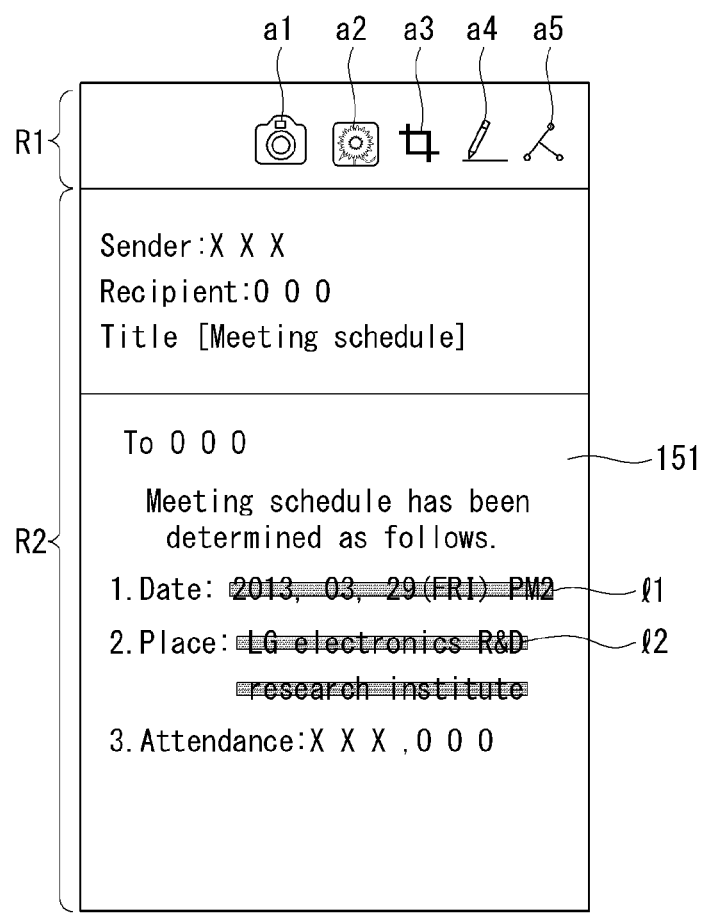

FIGS. 6A to 6C are views for explaining a method for receiving continuous touch input and displaying a line in the mobile terminal according to the first embodiment of the present disclosure.

Referring to FIG. 6A, the controller (180 of FIG. 1) may receive touch input applied to a touch pen icon a4 from among the icons displayed in the first region R1 of the touchscreen 151. Referring to FIG. 6B, the controller (180 of FIG. 1) may receive continuous touch input applied to a specific region "2013, 03, 29 (FRI) PM 2" of the e-mail image displayed in the second region R2.

Referring to FIG. 6C, the controller (180 of FIG. 1) may respectively display lines l1 and l2 on the "2013, 03, 29 (FRI) PM 2" and "LG electronics R&D research institute" to which continuous touch inputs are respectively applied in the second region R2 of the touchscreen 151. Here, the lines can be displayed in real time upon reception of the continuous touch inputs.

Figure 7:
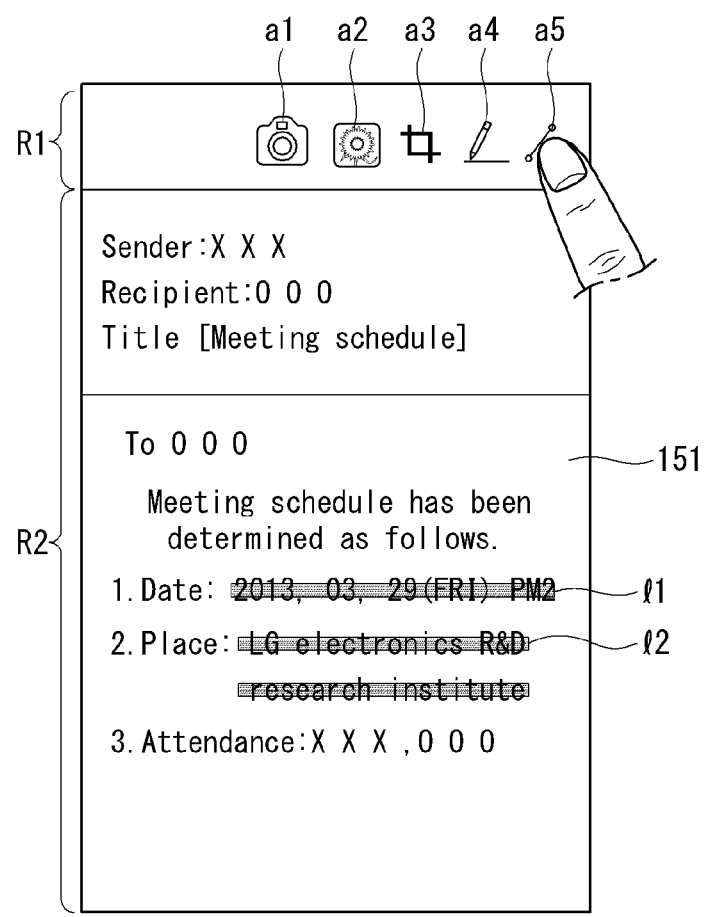
FIG. 7 illustrates a method for receiving specific input in the mobile terminal in accordance with the first embodiment of the present disclosure.

FIG. 7 is a view for explaining a method for receiving specific input in the mobile terminal according to the first embodiment of the present disclosure.

Upon reception of touch input applied to an execution icon a5 displayed in the first region R1 of the touchscreen 151 while the two lines l1 and l2 are displayed, the controller (180 of FIG. 1) may execute functions of executing the text corresponding to the lines and searching related applications. Here, the execution icon a5 is an icon through which a control signal for instructing text extraction and related application search to be executed can be input.

Figure 8A:
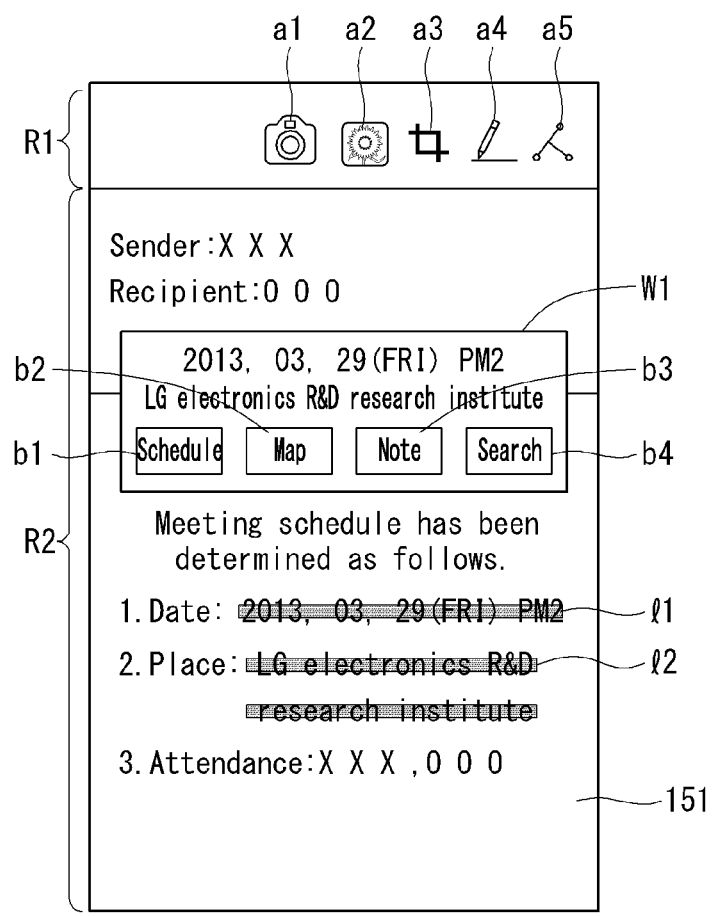

FIGS. 8A and 8B are views for explaining a method for extracting and displaying text in the mobile terminal according to the first embodiment of the present disclosure.

Referring to FIG. 8A, the controller (180 of FIG. 1) may extract the text "2013, 03, 29 (FRI) PM2" corresponding to the line l1 and the text "LG electronics R&D research institute" corresponding to the line l2 and display the texts in one pop-up window W1 together.

Here, icons b1 to b4 indicating applications related to the contents of the extracted texts corresponding to the two lines l1 and l2 may be displayed along with the extracted texts in the pop-up window W1.

Referring to FIG. 8B, the controller (180 of FIG. 1) may extract the text "2013, 03, 29 (FRI) PM2" corresponding to the line l1 and the text "LG electronics R&D research institute" corresponding to the line l2 and respectively display the texts in separate pop-up windows W1 and W2.

In addition, the controller (180 of FIG. 1) may display the icons b1 to b4 indicating applications related to the contents of the extracted text corresponding to the line l1 in the first pop-up window W1 and display icons b1' to b4' indicating applications related to the contents of the extracted text corresponding to the line l2 in the second pop-up window W2.

The related applications b1 to b4 and b1' to b4' may be recommended in descending order of frequency of use of applications, irrespective of the contents of text, or preprogrammed applications may be recommended.

Figure 9A:
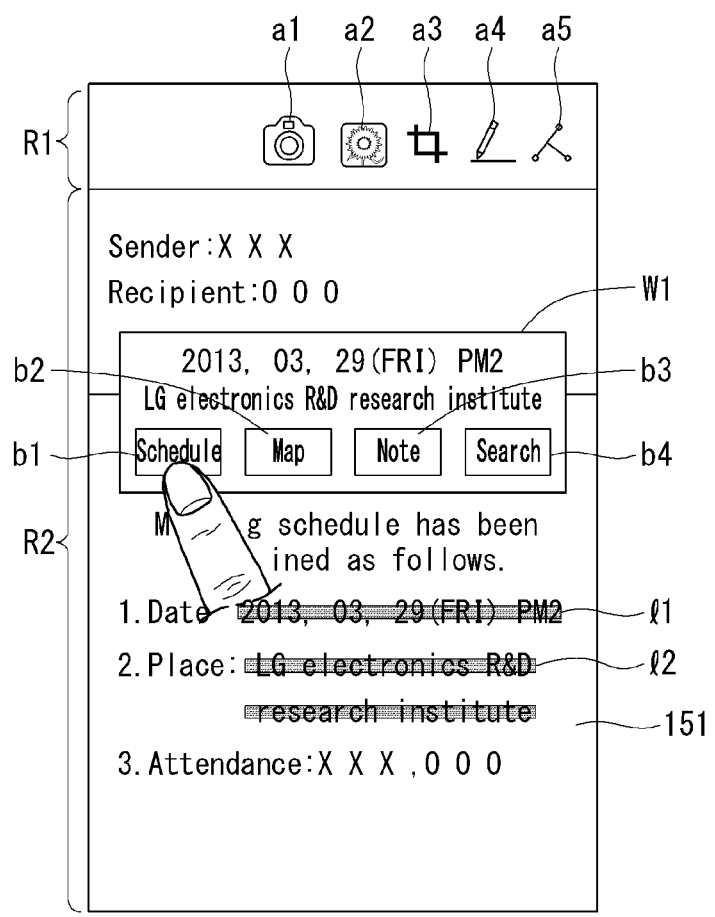
FIGS. 9A to 9C illustrate a method for inputting extracted text as an input item of a related application in the mobile terminal in accordance with the first embodiment of the present disclosure.
Figure 9B:
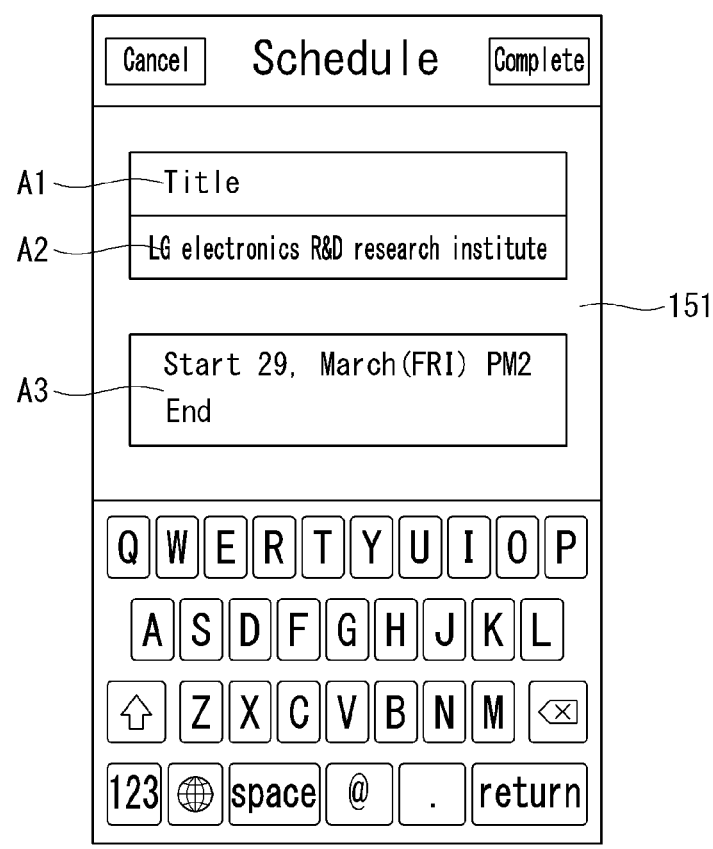
Figure 9C:
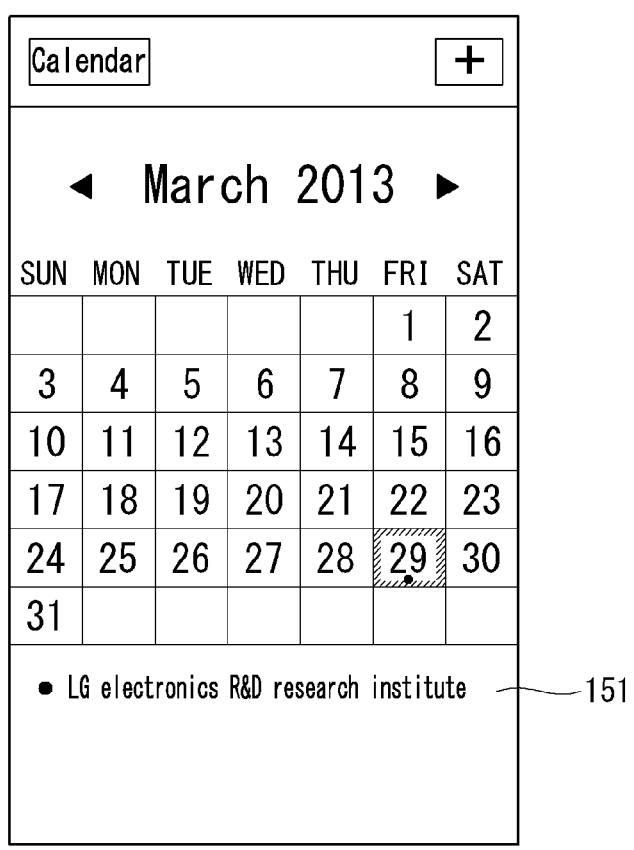

FIGS. 9A to 9C are views for explaining a method for inputting extracted text as an input item of a related application in the mobile terminal according to the first embodiment of the present disclosure.

Upon reception of touch input applied to one b1 of the icons b1 to b4 which indicate related applications and are displayed in the pop-up window W1, as shown in FIG. 9A, the controller (180 of FIG. 1) may convert the touchscreen 151 to the execution screen of the application corresponding to the icon b1 to which the touch input is applied, as shown in FIG. 9B.

In addition, the controller (180 of FIG. 1) may automatically display text corresponding to input items A2 and A3 matched to the contents of the texts displayed in the pop-up window W1 of FIG. 9A, from among input items A1 to A3 of the application execution screen.

For example, when text represents a date and a place, the text can be divided into parts respectively corresponding to input items matched to a date and a place and displayed.

Upon completion of input of the input items, the controller (180 of FIG. 1) may display the execution screen of the selected application, as shown in FIG. 9C.

FIG. 10 is a flowchart illustrating a method for controlling the mobile terminal according to a second embodiment of the present disclosure.

The second embodiment of the present disclosure differs from the first embodiment in that the former captures an image using the camera and uses the captured image before storing the image, and other configurations are the same as the first embodiment, and thus only the different configuration will be described.

Referring to FIG. 10, the controller (180 of FIG. 1) may capture an image using the camera (S210) and display the captured image on the touchscreen (S220).

That is, the controller (180 of FIG. 1) may extract text through OCR using an image displayed as a preview image on a camera application execution screen without being stored in the gallery application.

S230 to S270 of FIG. 10 correspond to those of the first embodiment and thus detailed description thereof is omitted.

A description will be given of an embodiment of a method for controlling the mobile terminal to photograph a business card using the camera, to extract specific text from a preview image and to execute a related application. It is assumed that the mobile terminal operates in the mode of processing OCR.

Figure 11A:
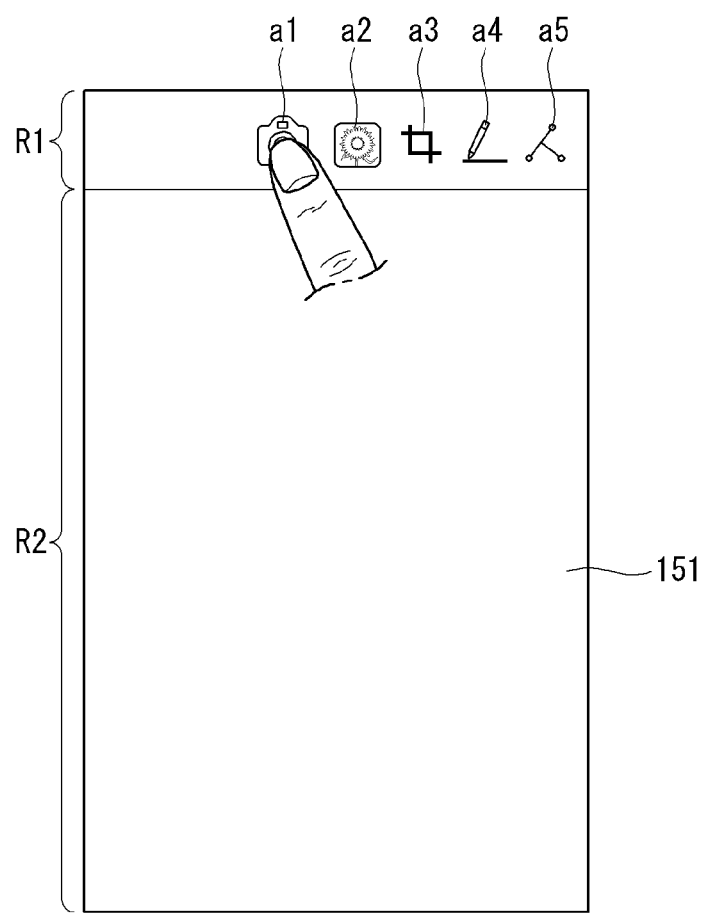
FIGS. 11A and 11B illustrate a method for acquiring an image in the mobile terminal in accordance with the second embodiment of the present disclosure.
Figure 11B:
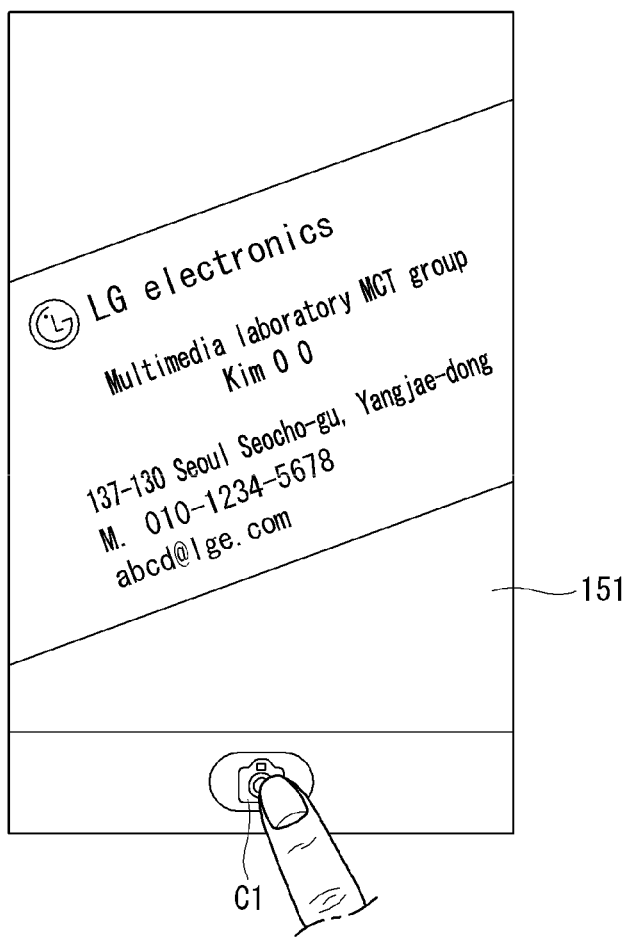

FIGS. 11A and 11B are views for explaining a method for acquiring an image in the mobile terminal according to the second embodiment of the present disclosure.

Referring to FIG. 11A, the controller (180 of FIG. 1) may display the icons a1 to a5 in the first region R1 of the touchscreen 151 and receive touch input applied to the icon a1 indicating a camera application, from among the icons a1 to a5.

Referring to FIG. 11B, the controller (180 of FIG. 1) may execute the camera application upon reception of the touch input applied to the camera icon a1 and capture an image of a business card. Upon reception of touch input applied to a photographing icon c1 by executing the camera application, the controller (180 of FIG. 1) may display the captured image of the business card in the second region R2 of the touchscreen 151 (refer to FIG. 12).

Figure 12:
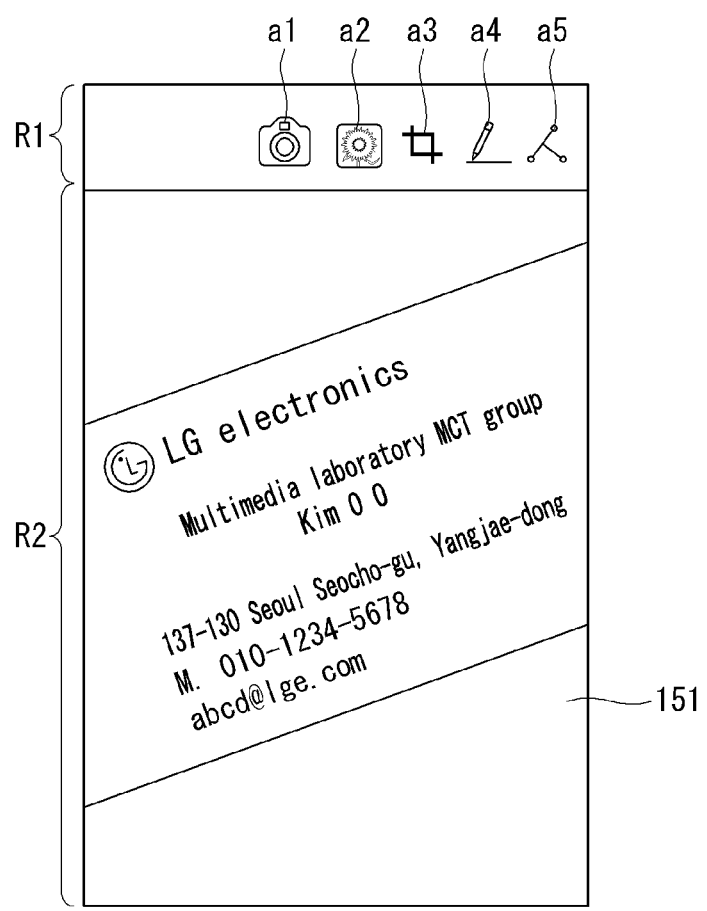
FIG. 12 illustrates a method for displaying an image in the mobile terminal in accordance with the second embodiment of the present disclosure.

FIG. 12 is a view for explaining a method for displaying an image in the mobile terminal according to the second embodiment of the present disclosure.

Referring to FIG. 12, the controller (180 of FIG. 1) may display a preview image of the captured image of the business card in the second region R2 of the touchscreen 151. That is, the image of the business card is displayed as a preview image after being captured and is not stored in the memory of the mobile terminal.

Figure 13A:
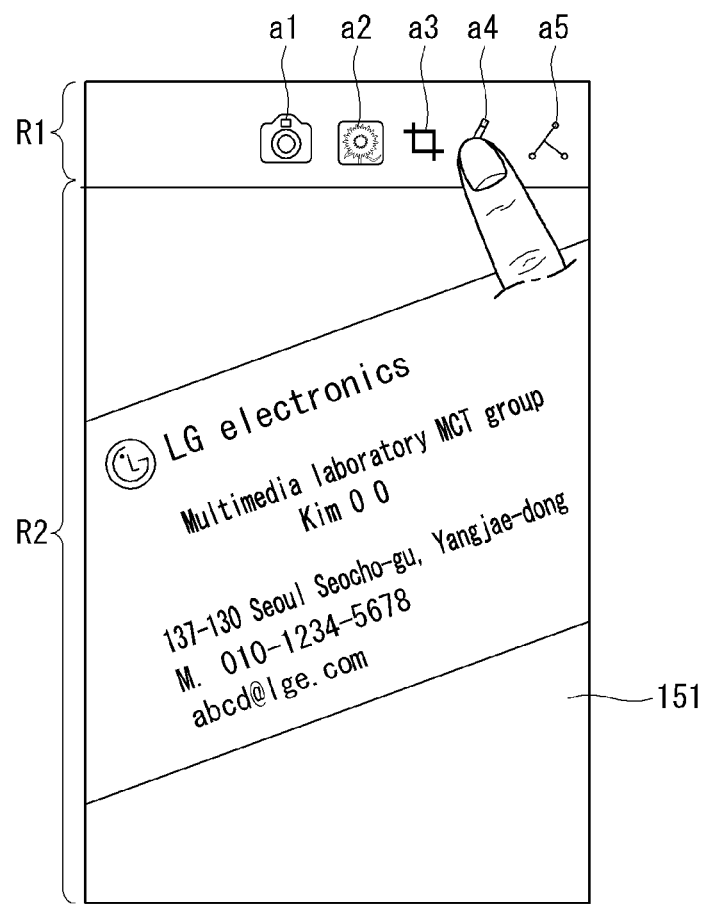
FIGS. 13A to 13C illustrate a method for receiving continuous touch input and displaying a line in the mobile terminal in accordance with the second embodiment of the present disclosure.
Figure 13B:
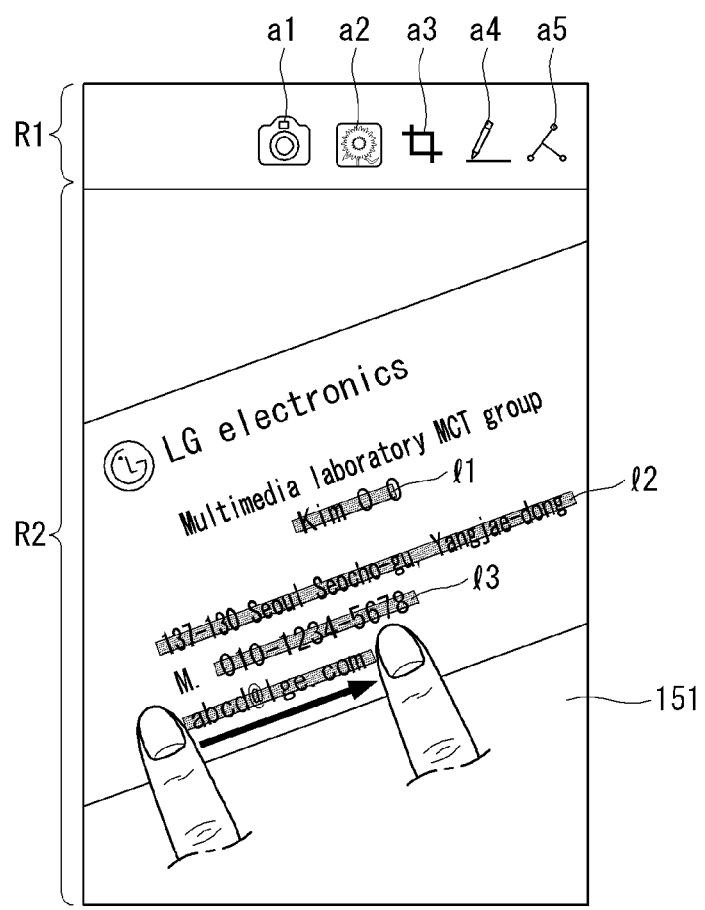
Figure 13C:
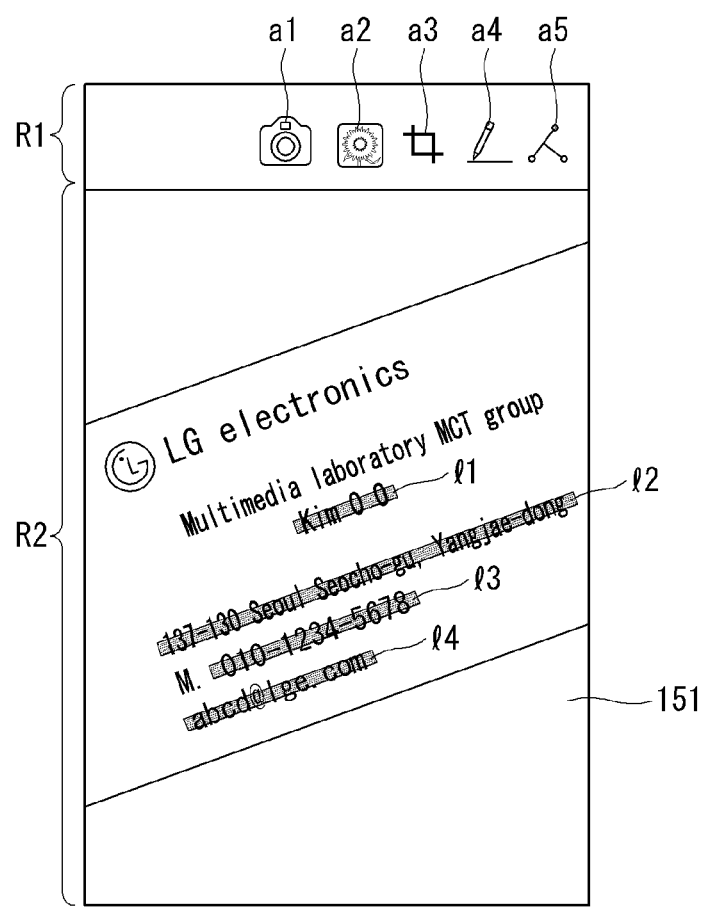

FIGS. 13A to 13C are views for explaining a method for receiving continuous touch input and displaying lines in the mobile terminal according to the second embodiment of the present disclosure.

The controller (180 of FIG. 1) may receive touch input applied to the touch pen icon a4 from among the icons displayed in the first region R1 of the touchscreen 151, as shown in FIG. 13A, and then receive continuous touch inputs respectively applied to specific regions "Kim OO", "137-130, Seoul, Seocho-gu, Yangjae-dong", "0101-1234-5678" and "abcd@lge.com" of the business card image displayed in the second region R2, as shown in FIG. 13B.

Referring to FIG. 13C, the controller (180 of FIG. 1) may respectively display lines l1, l2, l3 and l4 on the "Kim OO", "137-130, Seoul, Seocho-gu, Yangjae-dong", "0101-1234-5678" and "abcd@lge.com" to which the continuous touch inputs are respectively applied in the second region R2 of the touchscreen 151. Here, the lines may be displayed in real time upon reception of the continuous touch inputs.

Figure 14:
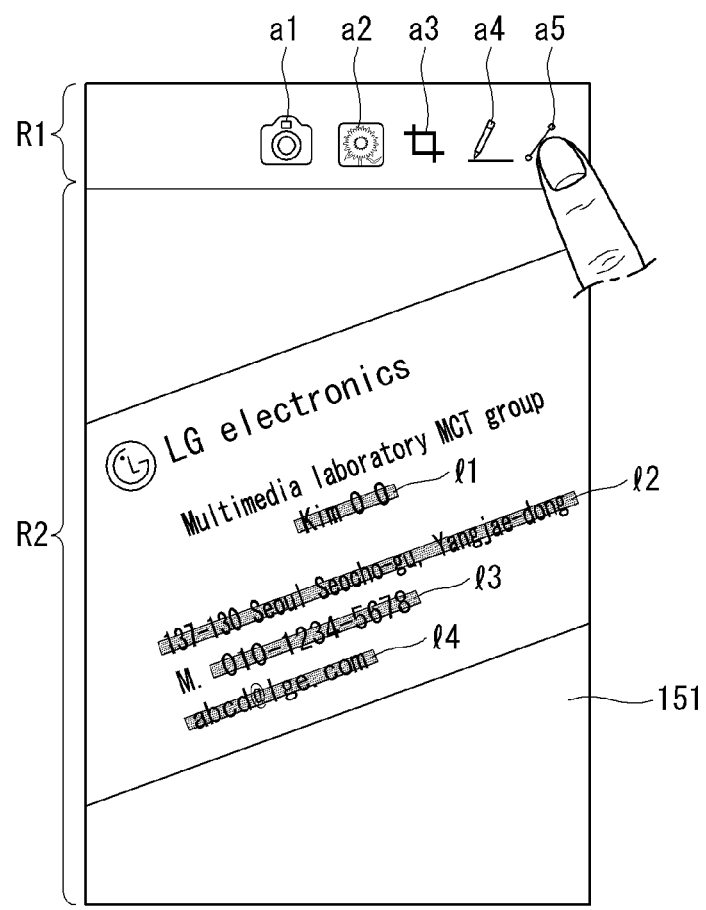
FIG. 14 illustrates a method for receiving specific input in the mobile terminal in accordance with the second embodiment of the present disclosure.

FIG. 14 is a view for explaining a method for receiving specific input in the mobile terminal according to the second embodiment of the present disclosure.

Upon reception of touch input applied to the execution icon a5 displayed in the first region R1 of the touchscreen 151 while the four lines l1 to l4 are displayed, the controller (180 of FIG. 1) may convert the current mode of the mobile terminal to the mode for extracting text corresponding to the lines and searching related applications.

Figure 15:
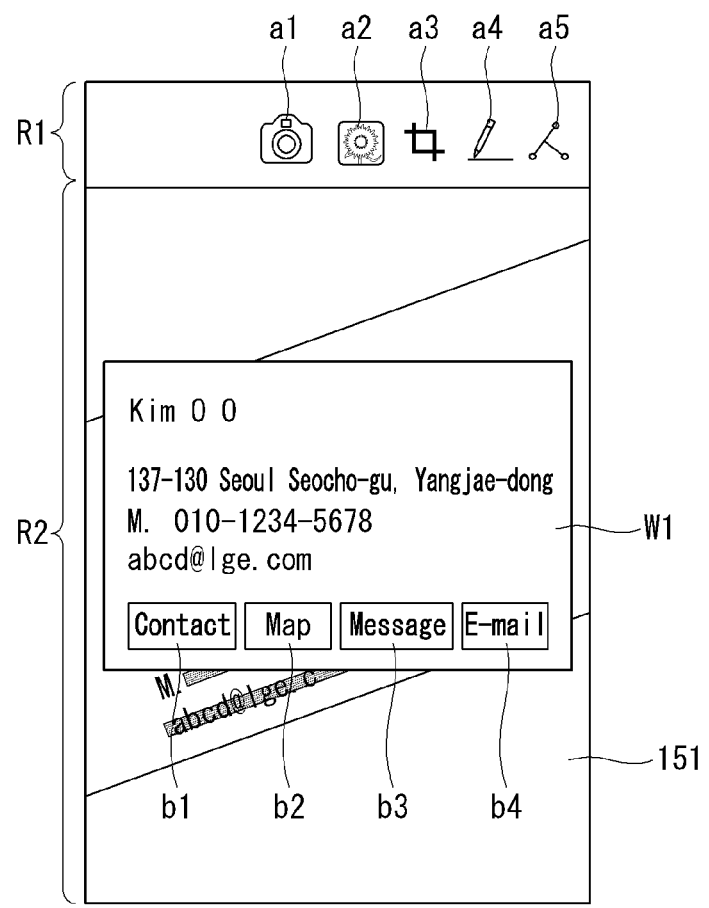
FIG. 15 illustrates a method for extracting and displaying text in the mobile terminal in accordance with the second embodiment of the present disclosure.

FIG. 15 is a view for explaining a method for extracting and displaying text in the mobile terminal according to the second embodiment of the present disclosure.

The method for extracting text corresponding to each line and the method for recommending related applications have been described in the first embodiment and thus detailed description thereof is omitted.

The controller (180 of FIG. 1) may extract text corresponding to each line, searching related applications and display the extracted text and the related applications in the pop-up window W1. Here, when texts are extracted from a plurality of lines, the extracted texts may be displayed in changed order.

In addition, the controller (180 of FIG. 1) may display the texts corresponding to the respective lines and icons indicating related applications in separate pop-up windows, as shown in FIG. 8A. Here, the shapes of the pop-up windows may be changed to indicate relations thereof with the lines corresponding thereto.

Figure 16A:
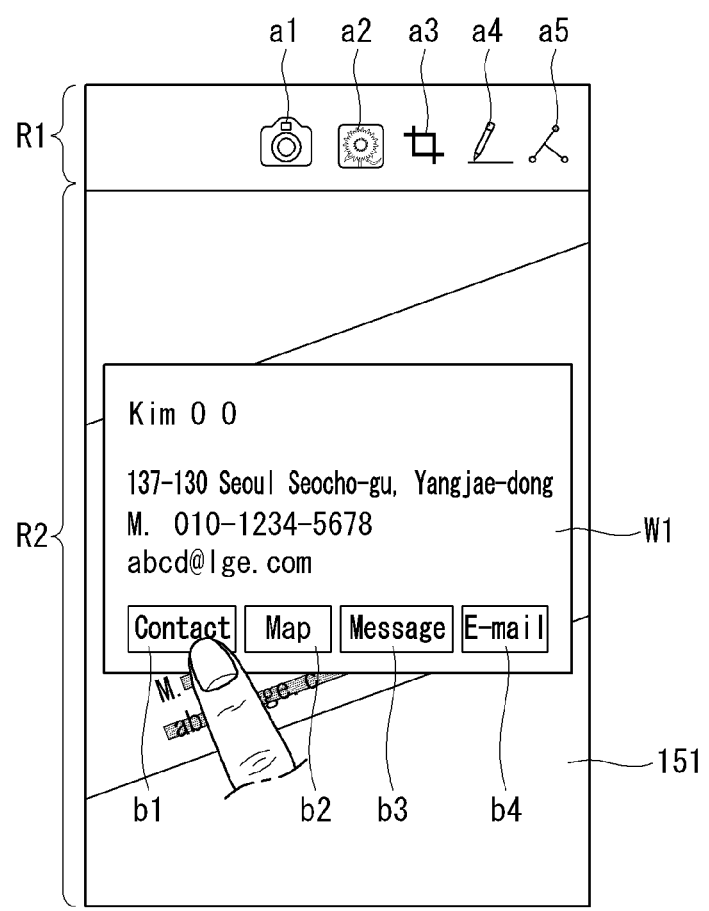
FIGS. 16A and 16B illustrate a method for inputting extracted text as an input item of a related application in the mobile terminal in accordance with the second embodiment of the present disclosure.
Figure 16B:
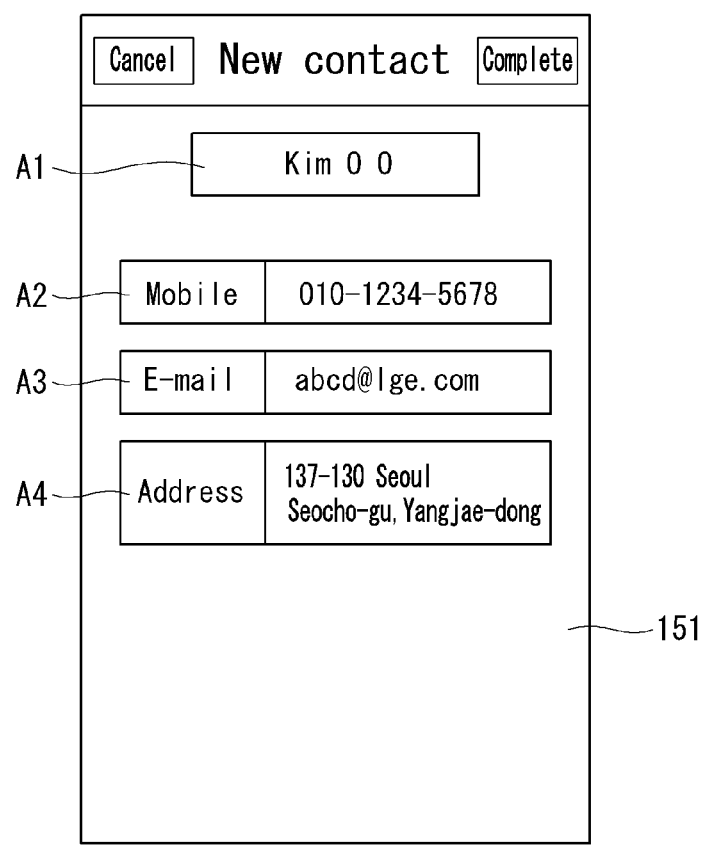

FIGS. 16A and 16B are views for explaining a method for inputting extracted text as an input item of a related application in the mobile terminal according to the second embodiment of the present disclosure.

Upon reception of touch input applied to one b1 of icons b1 to b4 which indicate related applications and are displayed in the pop-up window W1, as shown in FIG. 16A, the controller (180 of FIG. 1) may convert the touchscreen 151 to the execution screen of the application corresponding to the icon b1 to which the touch input is applied, as shown in FIG. 16B.

In addition, the controller (180 of FIG. 1) may automatically display texts corresponding to input items A1 to A4 of the application execution screen, as the input items A1 to A4 corresponding to the texts displayed in the pop-up window W1 of FIG. 16A.

For example, when the texts include a name, a cellular phone number, an e-mail address and an address, the texts can be divided into parts respectively corresponding to the input items and displayed as the corresponding input items.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The present invention can be applied to recording media storing application programs using optical text recognition, devices executing the application programs, and mobile terminals including smartphones, PDAs, notebook computers, IPTV systems and the like.

What is claimed is:

1. A mobile terminal, comprising:
   a touchscreen; and
   a controller configured to:
     cause the touchscreen to display an image including text;
     cause the touchscreen to display a line on a region of the image in response to a continuous touch input received on the touchscreen, the line generated along a trajectory of the continuous touch input;
     extract text, at least part of which corresponds to the line, in response to a specific input received via the touchscreen; and
     cause the touchscreen to display the extracted text in a pop-up window.

2. The mobile terminal of claim 1, wherein the controller is further configured to cause the touchscreen to display the line in real time while the continuous touch input is received.

3. The mobile terminal of claim 1, wherein the controller is further configured to cause the touchscreen to display a second line on a second region of the image in response to a second continuous touch input received on the touchscreen prior to receiving the specific input, the second line generated along a trajectory of the second continuous touch input.

4. The mobile terminal of claim 3, wherein the controller is further configured to:
   extract text at least part of which corresponds to each line;
   cause the touchscreen to display the extracted text in at least one pop-up window in response to the specific input;
   cause the touchscreen to display at least one icon representing a related application in the at least one pop-up window according to contents of the text, the related application executable in association with the contents of the text.

5. The mobile terminal of claim 1, wherein the controller is further configured to cause the touchscreen to display at least one icon representing a related application along with the extracted text in the pop-up window according to contents of the extracted text.

6. The mobile terminal of claim 5, wherein the controller is further configured to:
   execute an application corresponding to an icon in response to an input received with respect to the icon such that an execution screen of the application is displayed and the contents of the text displayed in the pop-up window are divided into multiple parts based on the contents of the text; and
   cause the touchscreen to display the divided parts as at least one input item of the execution screen.

7. The mobile terminal of claim 1, wherein the controller is further configured to:
   enter a mode for editing the line in response to a long touch input received via a point of the line; and
   cause the touchscreen to display an icon for controlling a length of the line or to display an icon for moving the line according to the point to which the long touch input has been received.

8. The mobile terminal of claim 1, wherein the controller is further configured to:
   cause the touchscreen to display the image that is magnified in response to the specific input; and
   fix the magnified image in response to a long touch input received via a portion of the magnified image.

9. The mobile terminal of claim 1, wherein the controller is further configured to enter a mode for editing the text in response to a touch input received via the text displayed in the pop-up window.

10. The mobile terminal of claim 1, wherein the controller is further configured to cause deletion of the line and the pop-up window from the touchscreen in response to an input received with respect to a reset icon displayed on the touchscreen.

11. The mobile terminal of claim 1, wherein:
    the line is displayed in a predetermined thickness; and
    the controller is further configured to cause the touchscreen to display the line transparently or translucently in a predetermined color or contrast.

12. The mobile terminal of claim 11, wherein the controller is further configured to:
    set a virtual region by extending the thickness of the line in a vertical direction; and
    extract text included in the virtual region.

13. The mobile terminal of claim 1, further comprising a camera,
    wherein the image is a preview image captured through the camera.

14. A method for controlling a mobile terminal, comprising:
    displaying an image including text on a touchscreen;
    receiving a continuous touch input on the touchscreen while the image is displayed;
    displaying a line on a region of the image in response to the continuous touch input, the line generated along a trajectory of the continuous touch input;
    receiving a specific input on the touchscreen;
    extracting text, at least part of which corresponds to the line, in response to the specific input; and
    displaying the extracted text in a pop-up window.

15. The mobile terminal of claim 1, wherein the pop-up window is formed on a portion of the image such that the portion of the image is obscured by the pop-up window.

16. The mobile terminal of claim 4, wherein:
    the at least one pop-up window comprises a first pop-up window and a second pop-up window that are separate from each other;
    first extracted text is displayed in the first pop-up window; and
    second extracted text is displayed in the second pop-up window.

17. The mobile terminal of claim 16, wherein:
    the first extracted text relates to date and time; and
    the second extracted text relates to a place or address.

18. The mobile terminal of claim 17, wherein each of the first pop-up window and the second pop-up window includes at least one icon representing a related application that is executable in association with the first or second extracted text.

19. The mobile terminal of claim 1, wherein the continuous touch input is received along the at least part of the text displayed on the touchscreen.

20. The mobile terminal of claim 19, wherein the line is displayed, overlapping the at least part of the text.

* * * * *